US006374595B1

(12) United States Patent
Penetrante et al.

(10) Patent No.: US 6,374,595 B1
(45) Date of Patent: *Apr. 23, 2002

(54) PLASMA-ASSISTED CATALYTIC STORAGE REDUCTION SYSTEM

(75) Inventors: Bernardino M. Penetrante, San Ramon; George E. Vogtlin, Fremont; Bernard T. Merritt; Raymond M. Brusasco, both of Livermore, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/491,234

(22) Filed: Jan. 25, 2000

Related U.S. Application Data (60) Continuation of application No. 09/116,554, filed on Jul. 15, 1998, now Pat. No. 6,038,853, which is a continuation-in-part of application No. 08/906,687, filed on Aug. 5, 1997, which is a division of application No. 08/699,381, filed on Aug. 19, 1996, now Pat. No. 5,711,147.

(51) Int. Cl.$^7$ ................................................. F01N 3/00
(52) U.S. Cl. ..................... 60/275; 60/274; 60/297; 60/301; 60/303; 422/183; 422/186.03; 422/186.04
(58) Field of Search .......................... 60/274, 275, 286, 60/303, 301, 299, 297; 422/182, 183, 186.03, 186.04, 186.16, 186.21

(56) References Cited

U.S. PATENT DOCUMENTS

| | | |
|---|---|---|
| 4,076,606 A | 2/1978 | Suzuki et al. |
| 4,954,320 A | 9/1990 | Birmingham et al. |
| 5,022,226 A | 6/1991 | Bell |

(List continued on next page.)

OTHER PUBLICATIONS

Hajo Suhr et al., "Reduction of Nitric Oxide in Flue Gases by Point to Plane Corona Discharge with Catalytical Coatings on the Plane Electrode," Combust. Sci. and Tech., vol. 72, pp. 101–115, (1990).

(List continued on next page.)

Primary Examiner—Thomas Denion
Assistant Examiner—Binh Tran
(74) Attorney, Agent, or Firm—Alan H. Thompson; Michael C. Staggs (57) ABSTRACT

A two-stage method for $NO_x$ reduction in an oxygen-rich engine exhaust comprises a plasma oxidative stage and a storage reduction stage. The first stage employs a non-thermal plasma treatment of $NO_x$ gases in an oxygen-rich exhaust and is intended to convert NO to $NO_2$ in the presence of $O_2$ and hydrocarbons. The second stage employs a lean $NO_x$ trap to convert such $NO_2$ to environmentally benign gases that include $N_2$, $CO_2$, and $H_2O$. By preconverting NO to $NO_2$ in the first stage with a plasma, the efficiency of the second stage for $NO_x$ reduction is enhanced. For example, an internal combustion engine exhaust is connected by a pipe to a first chamber in which a non-thermal plasma converts NO to $NO_2$ in the presence of $O_2$ and hydrocarbons, such as propene. A flow of such hydrocarbons ($C_xH_y$) is input from usually a second pipe into at least a portion of the first chamber. The $NO_2$ from the plasma treatment proceeds to a storage reduction catalyst (lean $NO_x$ trap) that converts $NO_2$ to $N_2$, $CO_2$, and $H_2O$, and includes a nitrate-forming catalytic site. The hydrocarbons and $NO_x$ are simultaneously reduced while passing through the lean-$NO_x$ trap catalyst. The method allows for enhanced $NO_x$ reduction in vehicular engine exhausts, particularly those having relatively high sulfur contents.

21 Claims, 5 Drawing Sheets

U.S. PATENT DOCUMENTS

| | | | |
|---|---|---|---|
| 5,208,205 | A | 5/1993 | Subramanian et al. |
| 5,236,672 | A | 8/1993 | Nunez et al. |
| 5,336,476 | A | 8/1994 | Kintaichi et al. |
| 5,424,044 | A | 6/1995 | Kalka |
| 5,440,876 | A | 8/1995 | Bayliss et al. |
| 5,474,747 | A | 12/1995 | Hayashi et al. |
| 5,492,678 | A | 2/1996 | Ota et al. |
| 5,500,194 | A | 3/1996 | Bell |
| 5,534,237 | A | 7/1996 | Yoshida et al. |
| 5,698,012 | A | 12/1997 | Yoshikawa |
| 5,711,147 | A | 1/1998 | Vogtlin et al. |
| 5,715,677 | A | 2/1998 | Wallman et al. |
| 5,746,984 | A | 5/1998 | Hoard |
| 5,855,855 | A * | 1/1999 | Williamson et al. ... 422/186.04 |
| 5,891,409 | A | 4/1999 | Hsiao et al. |
| 6,038,853 | A * | 3/2000 | Penetrante et al. ........... 60/274 |
| 6,176,078 | B1 * | 1/2001 | Balko et al. .................. 60/274 |

OTHER PUBLICATIONS

B. M. Penetrante, "Plasma Chemistry and Power Consumption in Non–Thermal DeNOx" Non–Thermal Plasma Techniques for Pollution Control Part A—Overview, Fundamentals and Supporting Technologies, pp. 65–89 (1993).

B. M. Penetrante et al., "NOx Reduction by Compact Electron Beam Processing," Proceedings of the 1995 Diesel Engine Emissions Reduction Workshop pp. IV–75 to IV–85, Jul. 24–27, 1995.

Naoki Takahashi et al., The new concept 3–way catalyst for automotive lean–burn engine: NOx storage and reduction catalyst, Catalysts Today 27, pp. 63–69, (1996).

A. Stout, "EPA Approaches to Diesel Engine Emissions Controls," Proceedings of the 1997 Diesel Engine Emissions Reduction Workshop, pp. 9–16, Jul. 28–31, 1997.

B. M. Penetrante et al., "Plasma–Assisted Heterogeneous Catalysis for NOx Reduction in Lean–Burn Engine Exhaust," Lawrence Livermore National Laboratory, Livermore, California, Internal Report UCRL–JC–128070, Dec. 12, 1997.

M. S. Brogan et al., "Recent Progress in NOx Trap Technology," Society of Automotive Engineers, Inc., Paper No. 980933 (1998).

Tadao Nakatsuji et al., "Highly Durable NOx Reduction System and Catalysts for NOx Storage Reduction System," Society of Automotive Engineers, Inc., Paper No. 980932 (1998).

* cited by examiner

PLASMA-ASSISTED CATALYTIC STORAGE REDUCTION SYSTEM

COPENDING APPLICATIONS

This is a Continuation of application Ser. No. 09/116,554 filed Jul. 15, 1998 U.S. Pat. No. 6,038,853.

This Application is a continuation-in-part of U.S. patent application Ser. No. 08/906,687, filed Aug. 5, 1997, which is a divisional application of U.S. patent application Ser. No. 08/699,381, filed Aug. 19, 1996, now U.S. Pat. No. 5,711,147 and titled, PLASMA ASSISTED CATALYTIC REDUCTION SYSTEM. Such applications are incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to $NO_x$ reduction, more particularly to reduction of $NO_x$ by $NO_x$ trap technology, and more particularly to systems for decomposing $NO_x$ to $N_2$ and other benign gases in oxygen-rich environments.

2. Description of Related Art

The control of $NO_x$ emissions from vehicles is a worldwide environmental problem. Gasoline engine vehicles can use newly developed three-way catalysts to control such emissions, because their exhaust gases lack oxygen. But so-called "lean-burn" gas engines, and diesel engines too, have so much oxygen in their exhausts that conventional catalytic systems are effectively disabled. Lean-burn, high air-to-fuel ratio, engines are certain to become more important in meeting the mandated fuel economy requirements of next-generation vehicles. Fuel economy is improved since operating an engine stoichiometrically lean improves the combustion efficiency and power output. But excessive oxygen in lean-burn engine exhausts can inhibit $NO_x$ removal in conventional three-way catalytic converters. An effective and durable catalyst for controlling $NO_x$ emissions under net oxidizing conditions is also critical for diesel engines.

Catalysts that promote the reduction of $NO_x$ under oxygen-rich conditions are generally known as lean-$NO_x$ catalysts. Difficulty has been encountered in finding lean-$NO_x$ catalysts that have the activity, durability, and temperature window required to effectively remove $NO_x$ from the exhaust of lean-burn engines. Prior art lean-$NO_x$ catalysts are hydrothermally unstable. A noticeable loss of activity occurs after relatively little use, and even such catalysts only operate over very limited temperature ranges.

Such catalysts that can effectively decompose $NO_x$ to $N_2$ and $O_2$ in oxygen-rich environments have been the subject of considerable research. (For instance, see, U.S. Pat. No. 5,208,205, issued May 4, 1993, to Subramanian, et al.) One alternative is to use catalysts that selectively reduce $NO_x$ in the presence of a co-reductant, e.g., selective catalytic reduction (SCR) using ammonia as a co-reductant.

However, another viable alternative involves using co-existing hydrocarbons in the exhaust of mobile lean-burn gasoline engines as a co-reductant and is a more practical, cost-effective, and environmentally sound approach. The search for effective and durable SCR catalysts that work with hydrocarbon co-reductants in oxygen-rich environments is a high-priority issue in emissions control and the subject of intense investigations by automobile and catalyst companies, and universities, throughout the world.

In the presence of hydrocarbons, catalysts that selectively promote the reduction of $NO_x$ under oxygen-rich conditions are known as lean-$NO_x$ catalysts, and more specifically— SCR lean-$NO_x$ catalysts. Selective catalytic reduction is based on the reaction of NO with hydrocarbon species activated on the catalyst surface and the subsequent reduction of $NO_x$ to $N_2$. More than fifty such SCR catalysts are conventionally known to exist. These include a wide assortment of catalysts, some containing base metals or precious metals that provide high activity. Unfortunately, just solving the problem of catalyst activity in an oxygen-rich environment is not enough for practical applications. Like most heterogeneous catalytic processes, the SCR process is susceptible to chemical and/or thermal deactivation. Many lean-$NO_x$ catalysts are too susceptible to high temperatures, water vapor and sulfur poisoning (from $SO_x$). As an example, the Cu-zeolite catalysts deactivate irreversibly if a certain temperature is exceeded. Catalyst deactivation is accelerated by the presence of water vapor in the stream and water vapor suppresses the NO reduction activity even at lower temperatures. Also, sulfate formation at active catalyst sites and on catalyst support materials causes deactivation. Practical lean-$NO_x$ catalysts must overcome all three problems simultaneously before they can be considered for commercial use.

In the case of sulfur poisoning, some gasoline can contain up to 1200 ppm of organo-sulfur compounds. Lean-$NO_x$ catalysts promote the conversion of such compounds to $SO_2$ and $SO_3$ during combustion. Such $SO_2$ will adsorb onto the precious metal sites at temperatures below 300° C. and thereby inhibits the catalytic conversions of CO, $C_x H_y$ (hydrocarbons) and $NO_x$. At higher temperatures with an $Al_2O_3$ catalyst carrier, $SO_2$ is converted to $SO_3$ to form a large-volume, low-density material, $Al_2(SO_4)_3$, that alters the catalyst surface area and leads to deactivation. In the prior art, the primary solution to this problem has been to use fuels with low sulfur contents.

A second leading catalytic technology for removal of $NO_x$ from lean-burn engine exhausts involves $NO_x$ storage reduction catalysis, commonly called the "lean-$NO_x$ trap." As with SCR lean-$NO_x$ catalysts, the lean-$NO_x$ trap technology can involve the catalytic oxidation of NO to $NO_2$ by catalytic metal components effective for such oxidation, such as precious metals; however, in the lean $NO_x$ trap, the formation of $NO_2$ is followed by the formation of a nitrate when the $NO_2$ is adsorbed onto the catalyst surface. The $NO_2$ is thus "trapped", i.e., stored, on the catalyst surface in the nitrate form and subsequently decomposed by periodically operating the system under stoiciometrically fuel-rich combustion conditions that effect a reduction of the released $NO_x$ (nitrate) to $N_2$.

Both lean-$NO_x$ SCR and lean-$NO_x$-trap technologies have been limited to use for low sulfur fuels because catalysts that are active for converting NO to $NO_2$ are also active in converting $SO_2$ to $SO_3$. Lean $NO_x$ trap catalysts have shown serious deactivation in the presence of $SO_x$ because, under oxygen-rich conditions, $SO_x$ adsorbs more strongly on $NO_2$ adsorption sites than $NO_2$, and the adsorbed $SO_x$ does not desorb altogether even under fuel-rich conditions. Such presence of $SO_3$ leads to the formation of sulfuric acid and sulfates that increase the particulates in the exhaust and poison the active sites on the catalyst. Attempts with limited success to solve such a problem have encompassed, for example, Nakatsuji et al. describing the use of selective $SO_x$ adsorbents upstream of lean $NO_x$ trap adsorbents.

Furthermore, catalytic oxidation of NO to $NO_2$ is limited in its temperature range. Oxidation of NO to NO2 by a conventional Pt-based catalyst maximizes at about 250° C. and loses its efficiency below about 100 degrees and above about 400 degrees. Thus, the search continues in the development of systems that improve lean $NO_x$ trap technology with respect to temperature and sulfur considerations.

The U.S. Federal Test Procedure for cold starting gasoline fueled vehicles presents a big challenge for lean-$NO_x$ trap catalysts due to the low-temperature operation involved. Diesel passenger car applications are similarly challenged by the driving cycle that simulates slow-moving traffic. Both tests require reductions of CO, hydrocarbons, and $NO_x$ at temperatures below 200° C. when located in the under-floor position. Modifications of existing catalyst oxidation technology are successfully being used to address the problem of CO and hydrocarbon emissions, but a need still exists for improved $NO_x$ removal.

SUMMARY OF THE INVENTION

The present invention provides a method for reducing $NO_x$ emissions and a vehicle with reduced $NO_x$ emissions. The present invention also provides a system for attachment to an engine with an oxygen rich exhaust for the reduction of $NO_x$ emissions.

Briefly, the present invention comprises a non-thermal plasma gas treatment of NO to produce $NO_2$ which is then combined with catalytic storage reduction treatment, e.g., a lean $NO_x$ trap, to enhance $NO_x$ reduction in oxygen-rich vehicle engine exhausts. In the lean $NO_x$ trap of the invention, the $NO_2$ from the plasma treatment is adsorbed on a nitrate-forming material, such as an alkali material, and stored as a nitrate. An engine controller periodically runs a brief fuel-rich condition to provide hydrocarbons for a reaction that decomposes the stored nitrate into benign products such as $N_2$. By using a plasma, the lean $NO_x$ trap catalyst can be implemented with known $NO_x$ adsorbers, and the catalyst may contain less or essentially no precious metals, such as Pt, Pd and Rh, for reduction of the nitrate to $N_2$.

Accordingly, an advantage of the present invention is that a method for $NO_x$ emission reduction is provided that is inexpensive and reliable. The plasma-assisted lean $NO_x$ trap can allow the life of precious metal lean $NO_x$ trap catalysts to be extended for relatively inexpensive compliance to $NO_x$ emission reduction laws.

Furthermore, not only does the plasma-assisted lean $NO_x$ trap process improve the activity, durability, and temperature window of lean $NO_x$ trap catalysis, but it also allows the combustion of fuels containing relatively high sulfur contents with a concommitant reduction of $NO_x$, particularly in an oxygen-rich vehicular environment. The present invention allows the use of a lean $NO_x$ trap to reduce $NO_x$ emissions in engine exhausts containing relatively high concentrations of sulfur, such as greater than 20 ppmw sulfur (calculated as S).

DETAILED DESCRIPTION OF THE INVENTION

Figure 1:
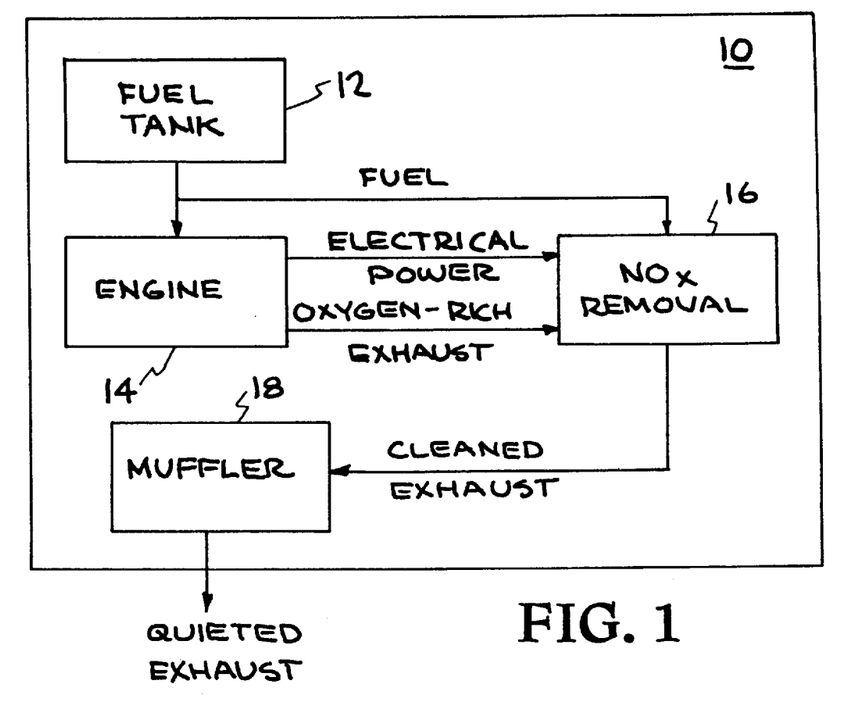
FIG. 1 is a function block diagram of a vehicle embodiment of the present invention.

FIG. 1 illustrates a vehicle embodiment of the present invention, and is referred to herein by the general reference numeral 10. The vehicle 10 is provided with a fuel tank 12 that supplies an internal combustion engine 14 and a $NO_x$ storage reduction unit 16. The fuel used may be #2 diesel oil or gasoline and the engine 14 may be a diesel type common to busses and trucks or a lean-burn gasoline engine. The engine 14 has an output of exhaust gas that is both rich in oxygen and oxides of nitrogen ($NO_x$), e.g., NO and $NO_2$. Oxygen-rich exhausts are typical of diesel engines and lean-burn gasoline engines. Such $NO_x$ in the exhaust is environmentally undesirable. The exhaust and electrical power, e.g., 12–24 VDC stepped up to high voltage, are input to the $NO_x$ reduction unit 16. Hydrocarbons in the fuel and a plasma created by the electrical power provided are used in a two-step conversion of hydrocarbons+NO→$NO_2$ and $NO_2$→$N_2$, $O_2$, $CO_2$, $H_2O$ by the $NO_x$ storage reduction unit 16. A muffler 18 is used to quiet the otherwise noisy cleaned exhaust.

Figure 2:
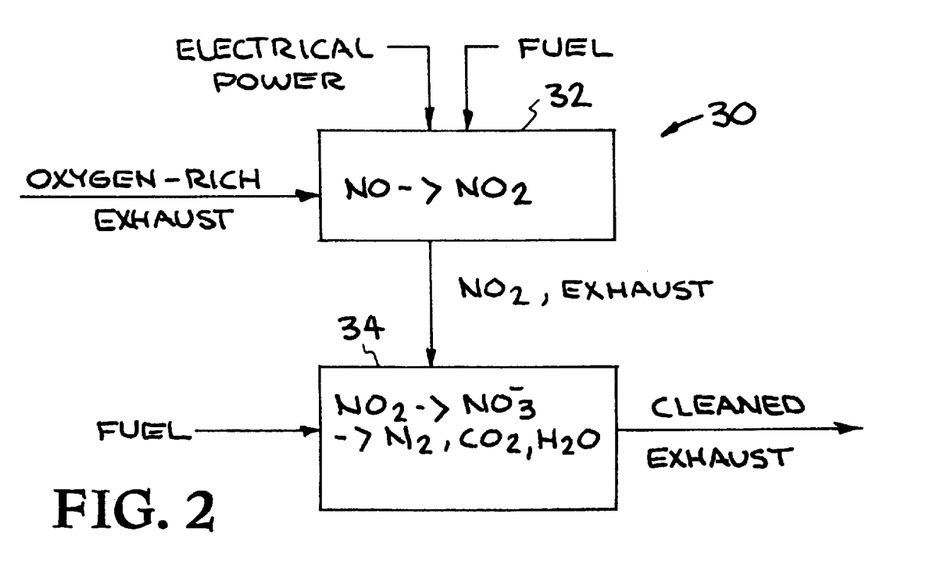
FIG. 2 is a flowchart diagram representing a method of the present invention for $NO_x$ reduction.

FIG. 2 represents a method of the present invention for $NO_x$ removal in oxygen-rich exhaust flows and is referred to herein by the general overall method 30. The $NO_x$ reduction unit 16 of FIG. 1 represents an implementation of method 30. An initial step in the method, represented as step 32, converts the NO in an oxygen-rich exhaust flow to $NO_2$ by mixing hydrocarbon molecules into the oxygen-rich exhaust flow and passing the mixture through a plasma reactor, i.e., a plasma processor or non-thermal electrical oxidizer. Substantially all the NO in the exhaust is converted to $NO_2$, i.e., preferably greater than 90 vol. percent of the NO is converted to $NO_2$ by the plasma. Complex hydrocarbons, such as diesel oil, may be reduced to simpler hydrocarbon molecules by cracking the complex hydrocarbon molecules with another plasma processor. The electrical power input is used to drive the plasma processors.

In a subsequent step of the method, represented as step 34, a lean $NO_x$ trap catalyst containing a dual-function catalytic component, i.e., an $NO_2$ adsorbent/nitrate-forming component, and a catalytic nitrate-reduction component is employed to promote the conversion of the hydrocarbons and $NO_2$ obtained from step 32 to more benign products. In step 34, the $NO_2$ obtained from the plasma reactor is passed to a storage reduction unit and adsorbed as a nitrate and stored onto the nitrate-storing catalytic component. A simple hydrocarbon may be periodically supplied to the $NO_x$ storage reduction unit, e.g., propene, to desorb the nitrate components from the lean $NO_x$ trap catalyst and then reduced to $N_2$. Substantially all of the $NO_2$ in the plasma-treated exhaust, i.e., the intermediate gas generated from the plasma reactor, is converted to $N_2$, typically greater than 80 vol. percent, preferably greater than 90 vol. percent, and most preferably, essentially all is converted. Some hydrocarbons may be better reductants or better nitrate desorbers. A disadvantage of having two or more different supplies of hydrocarbons is their maintanance aboard the vehicle 10.

Figure 3:
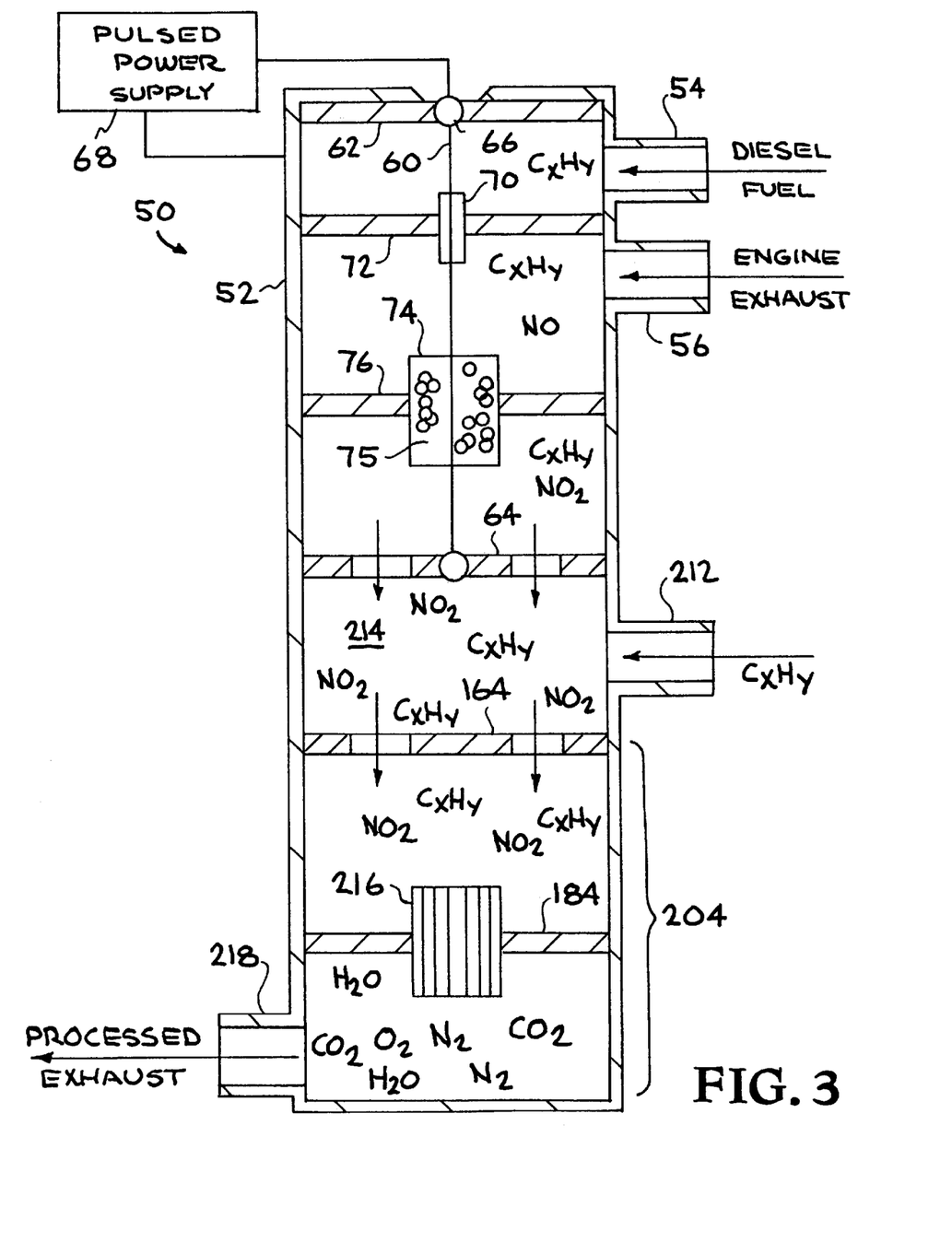
FIG. 3 is a cross sectional diagram representing a plasma/$NO_x$ catalytic storage reduction unit embodiment of the present invention.

FIG. 3 diagrams plasma and $NO_x$ reduction reactors of the present invention and is referred to herein by the overall $NO_x$ reduction system 50. The $NO_x$ reduction system 50 is similar to the $NO_x$ reduction unit 16 of FIG. 1 and similar in operation to the $NO_x$ reduction method 30 of FIG. 2. The $NO_x$ reduction system 50 comprises a cylindrical housing 52 with an atomized hydrocarbon inlet 54, an engine exhaust inlet 56 and a processed exhaust outlet 58. In the case of a lean burning gasoline engine exhaust, sufficient hydrocarbon concentrations can normally be injected through the exhaust inlet 56 by tuning the engine for periodic fuel-rich burning and the atomized hydrocarbon inlet 54 is not utilized. However, in the case of diesel engine combustion and exhaust, hydrocarbon inlet 54 is usually necessary for the injection of additional fuel for the plasma. The housing 52 need not be cylindrical and can take the form of an exhaust manifold attached to an engine. The higher temperatures afforded by close proximity of the $NO_x$ reduction system 50 to such engine are preferred. A corona-generating wire 60 is concentrically suspended along the axis of the housing 52 between a pair of insulative bulkheads 62 and 64. A number of corona balls 66 are connected at the ends of the wire 60 to prevent electrical breakdown. A pulsed power supply 68 is connected to the corona wire 60 and supplies high-voltage, high-current pulses with variable duty cycles and pulse repetition rates. For example, a voltage of 30,000 volts and a current of 100 amperes with a pulse duration of 100 nanoseconds and a pulse repetition rate of 50–5,000 Hz have provided good results. Such parameters may be made independently variable and microcomputer controlled to accommodate a variety of exhaust flow rates being processed. A preprocessor 70 is constructed as a concentric metal tube that pierces a metal bulkhead 72. The preprocessor 70 cracks the complex hydrocarbons provided from the inlet 54 into simpler hydrocarbons using a non-thermal plasma. The dimensions of the tube and the wire are selected to maintain a field enhancement sufficient to generate the coronal discharge. A stainless steel corona wire 60 with a diameter of 1.5 millimeter and a tube in the preprocessor 70 with an inside diameter of 6.2 centimeters have given good results. If propene or another similar hydrocarbon source is provided to the inlet 54, the preprocessor 70 is unnecessary and may be omitted. A processor 74 held in place by a metal bulkhead 76 uses both the simple hydrocarbons and a non-thermal plasma to convert NO in the flow from the engine exhaust inlet 56 into $NO_2$. A bed 75 of silica beads 4–10 millimeters each in diameter may be included to help trap and oxidize soot.

The pulsing of the electrical power applied to the corona wire 60 is critically controlled to generate only arc-precursor streamers that bridge the electrode gap within the processor 74 but do not arc. Such a processor is conventional and is variously referred to by artisans as a pulsed corona processor. Alternatively, the corona wire 60 or the inside walls of the processor 74 may be covered or coated with a dielectric layer to prevent DC arcs. Alternating current electrical power may then be used. Such a processor is known to artisans as a dielectric barrier discharge processor.

The mixture of $NO_2$ and simpler hydrocarbons from the plasma are passed to an optional mixing cavity 214 between insulative bulkheads 64 and 164 and such a mixture is then contacted with a lean $NO_x$ trap catalyst 216 mounted on bulkhead 184 in the downstream catalytic storage reduction reactor 204. Mixing cavity 214 comprises an atomized hydrocarbon inlet 212, which, if necessary (usually for diesel exhaust), can provide additional hydrocarbon to the storage reduction reactor 204. Benign products from the lean $NO_x$ trap catalyst, such as $N_2$, $O_2$, $CO_2$ and $H_2O$, can exit through processed exhaust outlet 218.

The bed of lean $NO_x$ trap catalyst 216 used in the $NO_x$ catalytic storage reduction reactor 204 contains at least one $NO_x$ adsorbing component which also serves as a nitrate storage component. The $NO_x$ adsorbing/nitrate storage component normally comprises an alkaline material that provides an alkaline catalytic surface, as for example, a base metal oxide such as CuO, BaO, SrO, $K_2O$, and $MnO_x$. The catalyst also contains catalytic components which promote the reduction of the stored nitrate, in the presence of hydrocarbons, to produce N2. The nitrate reduction component of the catalyst is usually a precious metal, such as Pt, Pd and/or Rh. Generally, such catalytic components are supported on porous refractory oxides such as $Al_2O_3$, ($La_2O$ stabilized alumina), zeolite, cordierite and perovskite. Accordingly, the lean $NO_x$ trap catalyst can contain at least one catalytic component selected from the group consisting of Pt, Rh, Pd, CuO, BaO, SrO, $K_2O$, $MnO_x$, $Al_2O_3$, $SiO_2$, $ZrO_2$, $La_2O$, zeolite, cordierite and perovskite.

Figure 4:
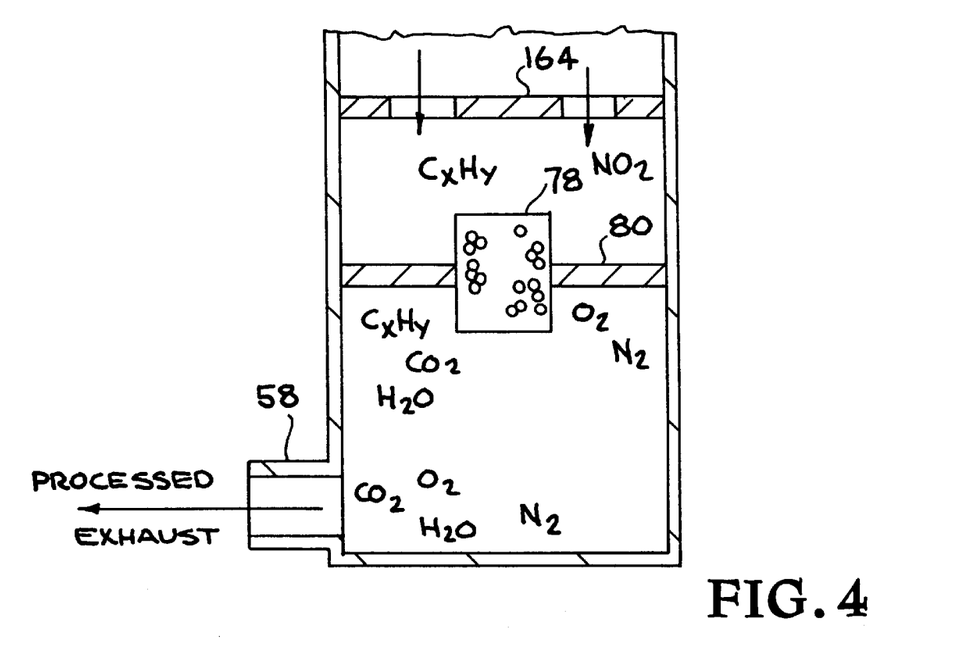
FIG. 4 is a cross sectional diagram representing a three way catalytic converter.

FIG. 4 diagrams the optional addition to $NO_x$ reduction system 50 shown in FIG. 3 of a three way catalytic converter. Downstream of the lean $NO_x$ catalytic storage reduction reactor, a three way catalytic converter 78 is optionally mounted on a bulkhead 80 and provides for the further catalytic reduction of $NO_2$ to more environmentally benign molecules, such as $N_2$, $O_2$, $CO_2$ and $H_2O$, using excess hydrocarbons that flow from the processor 74. The catalytic converter 78 may be configured as a bed of gamma alumina pellets, e.g., $\gamma$-$Al_2O_3$, and usually contains about 0.1–0.15 wt. % of precious metal such as Pt, Pd, and Rh and the alumina stabilized with $La_2O$ and/or $CeO_2$. The catalytic converter 78 may also be configured as a wash coat of gamma alumina on a substrate.

Oxygen enhances the catalytic storage reduction of $NO_2$ by hydrocarbons in conventional lean $NO_x$ trap systems as well as those of the invention. Lean-$NO_x$ trap catalysts have catalytic sites that can activate the NO by converting NO to $NO_2$, either in the gas phase or on the surface. In conventional lean $NO_x$ trap catalysis, the precious metal based catalysts that are active in converting NO to $NO_2$ are also active in converting $SO_2$ obtained from organosulfur components of combustible fuels and exhausts therefrom to $SO_3$. Prior to the present invention, $So_3$ has competed with $NO_2$ for adsorption at the active sites of the lean $NO_x$ trap catalysts and caused poisoning of the active sites on such catalysts. The $SO_3$ has further caused the formation of sulfuric acid and/or sulfate-containing particulates in the exhaust. The oxidation of NO to $NO_2$ by the plasma with little (i.e., less than 1 vol. %) accompanying conversion of $SO_2$ to $SO_3$ by the lean $NO_x$ trap catalyst allows the catalyst to adsorb $NO_2$ at the alkali sites and store the $NO_2$ as nitrate ions while in the presence of relatively high sulfur concentrations, usually in the form of organosulfur components of the fuel and/or the resultant sulfur-containing exhaust products. Accordingly, the present invention allows the removal of $NO_x$ from engines burning fuels and exhausts therefrom containing greater than about 20, preferably greater than about 50, and often in the range from greater than about 20 to about 500 ppmw of sulfur components, calculated as S.

The $NO_2$ stored as nitrate on the lean $NO_x$ trap catalyst will then be reduced on the catalyst surface when in the presence of hydrocarbons.

Oxidizing NO to $NO_2$ with a plasma allows the lean $NO_x$ trap catalyst itself to be devoted almost exclusively to the storage and reduction of $NO_2$ by the hydrocarbons. The plasma uses the hydrocarbons to enhance the oxidation of NO to $NO_2$. In the lean $NO_x$ trap catalyst, hydrocarbons help reduce $NO_2$ to $N_2$. Such plasma-assisted catalytic storage reduction may be expressed schematically in two steps, e.g., (1) plasma+NO+$O_2$+HC→$NO_2$+HC breakup products, and (2) catalyst+$NO_2$ (as stored nitrate)+HC→$N_2$+$CO_2$+$H_2O$, where HC refers to hydrocarbon molecules.

The plasma oxidizes the NO to $NO_2$ in the first (1) step. Lean-burn gasoline engine exhaust contains a significant amount of hydrocarbons in the form of propene. For example, a typical lean-burn (24:1 air-to-fuel ratio) 2.3 liter engine has emission levels of 250 ppm NO, 525 ppm propene, and 175 ppm propane. The ratio of propene to NO is typically 2 to 1. In the plasma, the oxidation of NO to $NO_2$ is strongly coupled with the hydrocarbon oxidation chemistry. The hydrocarbon promotes the oxidation of NO to $NO_2$, thus decreasing the amount of electrical energy required by the plasma. The plasma produces active free radicals by electron-impact dissociation of the background gas molecules $O_2$ and $H_2O$. These radicals decompose the hydrocarbon molecules, leading to the production of $HO_2$ and $RO_2$ radicals, where R is a hydrocarbon radical resulting from the dissocation of the hydrocarbon. The NO is then oxidized by:

NO+$HO_2$→$NO_2$+OH (a)

NO+$RO_2$→$NO_2$+RO (b)

The OH radical is reproduced during the oxidation of NO to $NO_2$, thus leading to a very efficient cyclic process. An advantage of the present invention is that the hydrocarbon molecules prevent the oxidation of $NO_2$ to nitric acid. Because the OH radical reacts preferentially with the hydrocarbon, the OH is not available to convert $NO_2$ to nitric acid.

The second (2) step breaks the original hydrocarbons into smaller molecules and radicals that could significantly enhance the activity of the catalyst. Thus, there is synergy in combining the plasma with the lean $NO_x$ trap catalyst.

Since many lean-$NO_x$ trap catalysts are more active toward $NO_2$, a preconversion of NO to $NO_2$ in the plasma is desirable to increase the overall $NO_x$ reduction efficiency. The hydrocarbons are used to enhance the NO oxidation process in the plasma, and the hydrocarbons are also required for the subsequent chemical reduction of NO on the lean $NO_x$ trap catalyst surface.

The plasma-assisted catalytic reduction process is a nonthermal plasma type of atmospheric-pressure plasma. See, B. M. Penetrante and S. E. Schultheis, Springer-Verlag, Berlin Heidelberg, 1993. A plasma is produced in which a majority of the electrical energy goes into the production of energetic electrons, rather than gas heating. Electron-impact dissociation and ionization of the background gas molecules allows energetic electrons to be used to produce free radicals, ions and additional electrons which, in turn, oxidize, reduce or decompose pollutant molecules.

The plasma-assisted catalytic reduction process improves the activity and durability of downstream $NO_x$ storage reduction catalysts for $NO_x$ reduction in lean-burn engine exhaust, and enables the use of catalysts that may not require precious metals, or may only require reduced amounts of precious metals.

The method of the present invention encompasses the plasma being used to oxidize NO to $NO_2$ and the following lean $NO_x$ trap catalyst being used to convert the $NO_2$ and hydrocarbons to $N_2$, $CO_2$ and $H_2O$.

Figure 5:
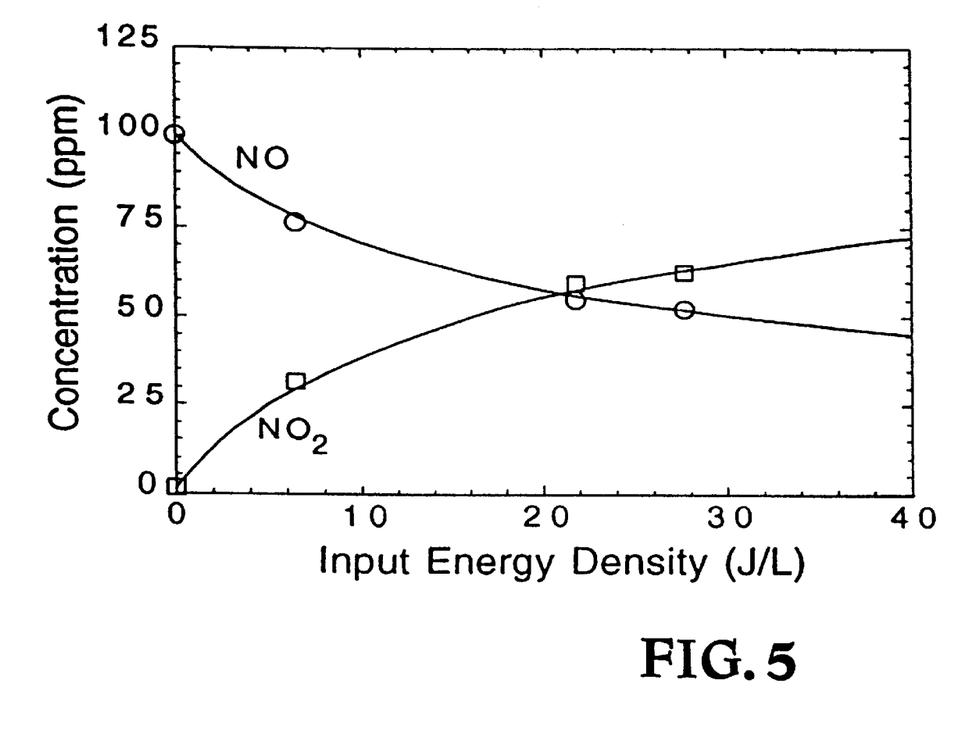
FIG. 5 is a graph showing the effect of plasma processing on the NO and $NO_2$ concentrations, at a gas temperature of 100° C. The concentrations are shown as functions of the electrical energy density (in units of Joules per standard liter of exhaust gas) applied to the plasma. The inlet gas concentrations were 100 ppm NO in 10% $O_2$, 90% $N_2$.
Figure 6:
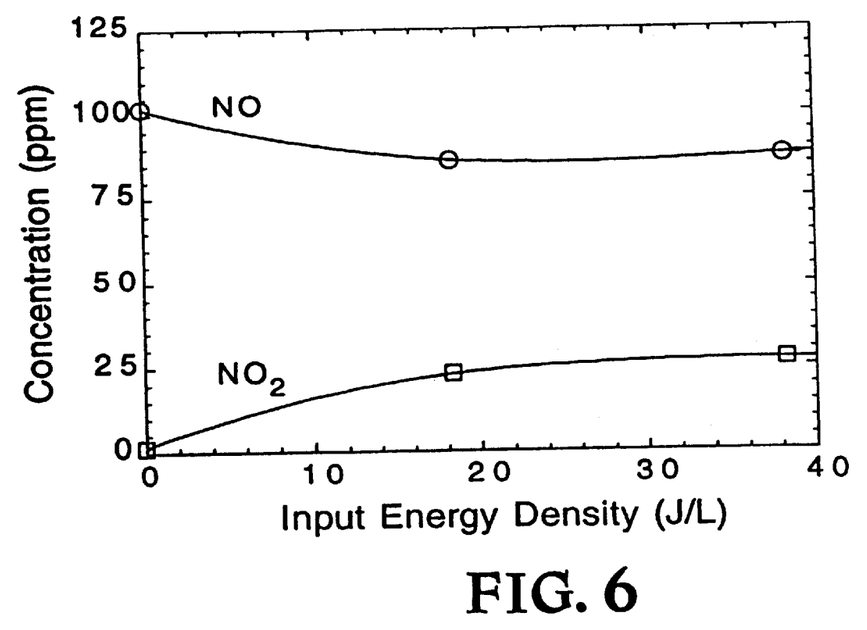
FIG. 6 is a graph showing the effect of plasma processing on the NO and $NO_2$ concentrations, at a gas temperature of 300° C. The inlet gas concentrations were 100 ppm NO in 10% $O_2$, 90% $N_2$.
Figure 7:
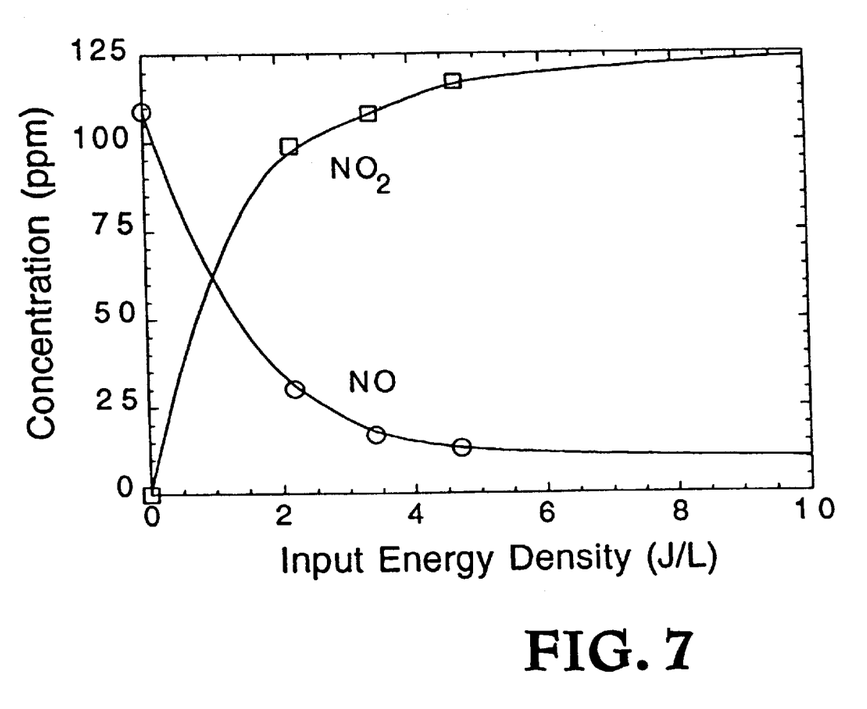
FIG. 7 is a graph showing hydrocarbon-enhanced oxidation of NO to $NO_2$ in a plasma, at a gas temperature of 350° C. The inlet gas concentrations were 100 ppm NO, 300 ppm $C_3H_6$ in 10% $O_2$, 90% $N_2$.

The hydrocarbon-enhanced oxidation of NO to $NO_2$ in a plasma has been verified in experiments. The following figures (i.e., 5, 6, and 7) show the concentrations of NO and $NO_2$ as functions of the electrical energy density applied to the plasma, e.g., electrical power input divided by the total gas flow rate. The processes that determine the concentrations of NO and $NO_2$ can be attributed entirely to reactions in the gas phase. The plasma was produced by a pulsed corona reactor, which consisted simply of a wire in a metal pipe. The plasma reactor was driven by a pulsed high-voltage power supply.

The electrons in the plasma lead to two important dissociation processes, $$e+N_2 \rightarrow e+N+N, \text{and} \qquad (1)$$

$$e+O_2 \rightarrow e+O+O. \qquad (2)$$

The nitrogen atoms produced in electron-impact reaction (1) can lead to the desirable chemical reduction of NO via the reaction, $$N+NO \rightarrow N_2+O. \qquad (3)$$

The oxygen atoms produced in electron-impact reaction (2) leads to the chemical oxidation of NO to $NO_2$, $$O+NO+M \rightarrow NO_2+M, \qquad (4)$$

where M is any molecule acting as a third body reactant.

In mixtures containing 5% or more $O_2$, as in lean-burn engine exhausts, analyses of the electron-molecule collision cross sections have shown that the probability for dissociation of $O_2$ is much higher than that for dissociation of $N_2$. The oxidation reaction (4) dominates over the reduction reaction (3).

Experimental evidence for such is shown in FIG. 5 for a gas temperature of 100° C. 100 ppm NO in 10% oxygen, balance nitrogen in simulated engine exhaust is converted to $NO_2$. A decrease in NO concentration can be attributed entirely to oxidation to $NO_2$.

For gas temperatures around 300° C. or more, which are more typical of engine exhausts, another reaction becomes important, $$O+NO_2 \rightarrow NO+O_2. \qquad (5)$$

Reaction (5) will compete with reaction (4) when the gas temperature is high. The net result is a decrease in the amount of NO that can be oxidized to $NO_2$. FIG. 6 shows the experimental evidence for such for a gas temperature of 300° C. 100 ppm NO in 10% oxygen and the balance $N_2$ in simulated engine exhaust is converted to $NO_2$.

However, in the presence of hydrocarbons, the O radicals of the plasma will preferentially react with the hydrocarbon molecules to produce very reactive hydrocarbon intermediates that can serve to enhance the oxidation of NO to $NO_2$ even at high gas temperatures. The decomposition of one $C_3H_6$ molecule by one O radical can lead to the oxidation of several NO molecules. Experimental evidence for propene-enhanced oxidation of NO to $NO_2$ in a plasma is shown in FIG. 7. 300 ppm hydrocarbons in 10% free oxygen in simulated engine exhaust provide a plasma conversion for 100 ppm NO to $NO_2$ that exceeds 80% at a temperature of about 350 degrees C. In the presence of hydrocarbons, it is possible to oxidize a substantial (i.e., >90 vol. percent) fraction of the initial NO at high gas temperatures. Furthermore, the electrical energy required for the plasma oxidation process is small.

Figure 8:
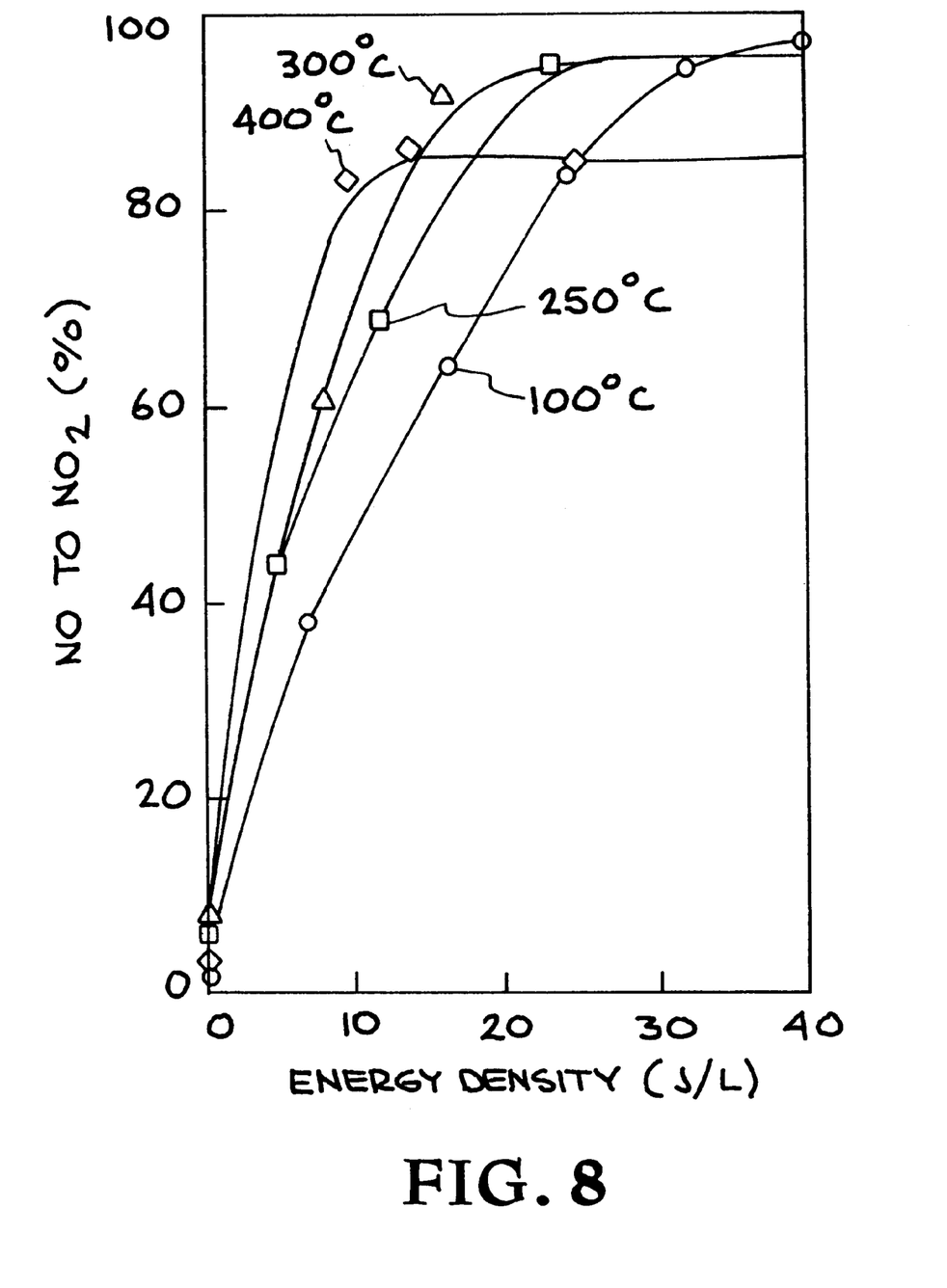
FIG. 8 is a graph showing the percentage of NO to $NO_2$ conversion in a plasma at temperatures from 100 degrees C. to 400 degrees C. The inlet concentrations were 500 ppm NO in 10% O2, $[C_3H_6]/[NO_x]=2$.

The plasma oxidation of NO to $NO_2$ has been evidenced at greater than 80% conversion levels at temperatures from 100 degrees C. to 400 degrees C. In FIG. 8, hydrocarbons in a ratio of 2:1 to $NO_x$ provide a plasma conversion for 500 ppm NO of more than 80%, and in some cases more than 90% at temperatures in the range from about 100 degrees C. to about 400 degrees C.

A method embodiment of the present invention for reducing nitrogen oxides ($NO_x$) in engine exhausts comprises the steps of, (1) converting substantially all NO in an engine exhaust to an intermediate gas flow including $NO_2$, and (2) converting substantially all of said intermediate gas flow including $NO_2$ to an output gas flow comprising $NO_2$ conversion products of $N_2$ and $O_2$ and substantially little $NO_x$. The $NO_x$ containing exhaust may be produced by other types of high-temperature combustion sources such as gas-fired burners, coal-fired power generators, and thermal incinerators. The step of converting substantially all NO in an exhaust to an intermediate gas flow including $NO_2$ can alternatively include the use of a plasma converter or a catalyst.

The step of converting substantially all NO in an exhaust to an intermediate gas flow including $NO_2$ preferably includes the use of an electrical discharge plasma cell with one or more pair of electrodes to which high-voltage is provided. A voltage generation means for providing direct current, alternating current or pulsed high voltage waveform is connected to the electrodes. The gases to be treated are conducted through the volume between or in the vicinity of the electrodes.

The step of converting substantially all NO in an exhaust to an intermediate gas flow including $NO_2$ can alternatively include the use of an electron beam-generated plasma cell with an electron gun having a thermionic or cold plasma cathode. A voltage generation means is included to provide direct current, alternating current or pulsed voltage waveform to the electron gun. The vacuum provided for the electron gun must be separated from the high pressure region with the gases that are processed but still allow the gasses to be irradiated.

A solid dielectric-barrier material can be used adjacent to one or more of the high-voltage electrodes. Alternatively, a liquid layer can be used adjacent to one or more of the high-voltage electrodes to act as a dielectric-barrier and/or a process product scrubber. The high-voltage electrodes can be imbedded within a solid dielectric such that a surface discharge plasma is produced. The volume between one or more pairs of electrodes can be packed with dielectric pellets or glass wool, or other dielectric materials, that allow the gas to pass through the volume. The electrodes can also be coated with a layer of catalytic material and/or mechanically articulated to vary the electrode gap between points on the surface of opposing electrodes. The dielectric material used can be an oxidation catalyst that supplementarily converts NO in an exhaust to an intermediate gas flow including $NO_2$, or a lean $NO_x$ trap catalyst that converts $NO_2$ formed in the plasma to a gas flow containing less $NO_x$.

The step of converting substantially all NO in an exhaust to an intermediate gas flow including $NO_2$ may also include the use of a plasma converter functioning as an electrostatic precipitator or particulate trap, or that oxidizes carbonaceous particles, such as soot, to carbon oxides ($CO_x$) and $H_2O$. A reactive gas can be introduced to enhance the oxidation of NO to $NO_2$, or $NO_2$ to $N_2$ and $O_2$.

The hydrocarbons mentioned herein, may be selected from the group of alkanes, alkenes, alkynes, aromatics, alcohols, aldehydes, ketones, ethers, and esthers.

The step of converting substantially all NO in an exhaust to an intermediate gas flow including $NO_2$ may also include the use of a solid electrochemical cell having one or more pair of electrodes to which low-voltage is provided, a voltage generation means providing direct current, alternating current or pulsed low voltage waveform to the electrodes, and conducting the gases to be treated through the volume in the vicinity of the electrodes.

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. A method for reducing nitrogen oxides ($NO_x$) in exhausts from high-temperature combustion, the method comprising the steps of:

converting substantially all NO in an engine exhaust with a non-thermal plasma to an intermediate gas flow including $NO_2$;

converting, in the presence of hydrocarbons, substantially all of said intermediate gas flow including $NO_2$ to an output gas flow comprising $NO_2$ conversion products of N2, $CO_2$ and $H_2O$ and substantially little NO and $NO_2$ ($NO_x$); and wherein, a storage reduction catalyst is used to convert said $NO_2$ in the presence of said hydrocarbons, to $N_2$, $CO_2$, and $H_2O$.

2. A two-stage catalytic converter, comprising:

an engine-exhaust gas inlet;

an oxidative first stage plasma converter of NO to $NO_2$ in the presence of $O_2$ and hydrocarbons and connected to the engine-exhaust gas inlet;

a hydrocarbon inlet; and a catalytic storage reduction second stage connected to receive a mixture of $NO_2$ from the oxidative first stage plasma converter and hydrocarbons from the hydrocarbon inlet or from the engine exhaust gas inlet, and that further serves to convert $NO_2$ to gases that include $N_2$, $CO_2$, and $H_2O$; and wherein by preconverting NO to $NO_2$ in the first stage, the efficiency of the second stage for $NO_x$ reduction is enhanced.

3. The converter of claim 2, wherein:

the catalytic storage reduction second stage includes a lean $NO_x$ trap catalyst; and wherein hydrocarbons and $NO_x$ are simultaneously reduced while passing through the second stage.

4. The converter of claim 2, wherein the catalytic storage reduction second stage contains a lean $NO_x$ trap catalyst having a catalytic component selected from the group consisting of Pt, Rh, Pd, CuO, BaO, SrO, $K_2O$, $MnO_x$, $Al_2O_3$, $SiO_2$, $ZrO_2$, $La_2O$, zeolite, cordierite and perovskite.

5. A method for reducing nitrous oxides ($NO_x$) in oxygen rich exhausts from high-temperature combustion, the method comprising the steps of:

converting substantially all NO in an engine oxygen-rich exhaust in the presence of hydrocarbons to an intermediate gas flow including $NO_2$ and substantially little $SO_3$ in a non-thermal plasma reactor; and converting substantially all of said intermediate gas flow including $NO_2$ in a catalytic storage reduction reactor to an output gas flow comprising $NO_2$ conversion products of $N_2$, $CO_2$ and $H_2O$ and substantially little NO and $NO_2$ ($NO_x$); and wherein, a storage reduction catalyst is used to convert said $NO_2$ in the presence of said hydrocarbons to $N_2$, $CO_2$, and $H_2O$.

6. The method of claim 5, wherein:

the converting of substantially all of said intermediate gas flow including $NO_2$ to an output gas flow comprising little $NO_x$ includes the formation of nitrate on a catalyst in the catalytic storage reduction reactor and further includes the addition of hydrocarbons.

7. The method defined in claim 6 wherein a catalyst contained in said catalytic storage reduction reactor contains a component selected from the group consisting of Pt, Rh, Pd, CuO, BaO, SrO, $K_2O$, $MnO_x$, $Al_2O_3$, $SiO_2$, $ZrO_2$, $La_2O$, zeolite, cordierite and perovskite.

8. A system for $NO_x$ reduction in oxygen-rich vehicle engine exhausts, comprising:

a first reactor means for non-thermal plasma gas treatment connected to receive a supply of hydrocarbons and an engine exhaust rich in oxygen and having NO, and connected to output a product of $NO_2$ that has been electric-plasma converted from said NO; and a second reactor means for catalytic storage reduction connected to receive both said output of the first reactor means with said $NO_2$ and connected to receive a supply of hydrocarbons, and connected to output an exhaust with reduced $NO_x$ emissions.

9. The system of claim 8 wherein:

the first reactor means includes a plasma processor connected to receive a pulsed high voltage current from an electrical power supply and includes a common inlet for said supply of hydrocarbons and said engine exhaust.

10. The system of claim 8 wherein:

the first reactor means includes a plasma processor having a central wire connected to receive a pulsed high voltage current from an electrical power supply and a body filled with beads positioned to collect and eliminate soot from said engine-exhaust.

11. The system of claim 8 wherein:

the first reactor means includes a pre-processor having a central wire connected to receive a plused high voltage current from an electrical power supply and providing for the cracking of complex hydrocarbons to simpler hydrocarbon molecules.

12. The system of claim 8 wherein the first reactor means includes:

a pre-processor having a central wire connected to receive a pulsed high voltage current from an electrical power supply and providing for the cracking of complex hydrocarbons to simpler hydrocarbon molecules; and a plasma processor sharing said central wire and having a body filled with beads positioned to collect and eliminate soot from said engine exhaust.

13. The system of claim 8 wherein:

the second reactor means further includes a bed of lean $NO_x$ catalyst containing a component selected from the group consisting of Pt, Rh, Pd, CuO, BaO, SrO, $K_2O$, $MnO_x$, $Al_2O_3$, $SiO_2$, $ZrO_2$, $La_2O$, zeolite, cordierite and perovskite.

14. A vehicle with reduced $NO_x$ engine exhaust emissions, comprising:

a fuel supply of hydrocarbons;

an internal combustion engine connected to receive said fuel supply of hydrocarbons and to propel a vehicle, and having an oxygen-rich exhaust comprising NO;

a first reactor means for non-thermal plasma gas treatment connected to receive an electrical supply, said fuel supply of hydrocarbons, and said oxygen-rich exhaust comprising NO, and connected to output therefrom a product of $NO_2$ that has been electric-plasma converted from said NO; and a second reactor means for catalytic storage reduction connected to receive said output of the first reactor means with said NO2 and connected to receive said supply of hydrocarbons, and connected to output an exhaust with reduced $NO_x$ emissions.

15. The vehicle defined in claim 14 wherein said fuel supply further comprises organosulfur components in a concentration greater than about 20 ppmw sulfur, calculated as S.

16. The vehicle defined in claim 14 wherein said second reactor means equipped to contain a catalyst comprising a nitrate-storage component.

17. The vehicle defined in claim 14 wherein said internal combustion engine adapted to combust diesel fuel and said second reactor means connected to receive diesel fuel.

18. A method for reducing nitrogen oxides ($NO_x$) in exhausts from high-temperature combustion, the method comprising the steps of:

converting substantially all NO in an engine exhaust with a non-thermal plasma to an intermediate gas flow including $NO_2$;

converting, in the presence of hydrocarbons, substantially all of said intermediate gas flow including $NO_2$ to an output gas flow comprising $NO_2$ conversion products of $N_2$, $CO_2$ and $H_2O$ and substantially little NO and $NO_2$ ($NO_x$), wherein said intermediate gas flow contains essentially no nitric acid; and wherein, a storage reduction catalyst adsorbs said $NO_2$ and is used to convert said $NO_2$ in the presence of said hydrocarbons, to $N_2$, $CO_2$, and $H_2O$.

19. A method for reducing nitrogen oxides ($NO_x$) in exhausts from high-temperature combustion, the method comprising the steps of:

converting substantially all NO in an engine exhaust with a non-thermal plasma to an intermediate gas flow including $NO_2$, wherein said engine exhaust comprises greater than about 20 ppmw S;

converting, in the presence of hydrocarbons, substantially all of said intermediate gas flow including $NO_2$ to an output gas flow comprising $NO_2$ conversion products of $N_2$, $CO_2$ and $H_2O$ and substantially little NO and $NO_2$ ($NO_x$), wherein said intermediate gas flow contains essentially no nitric acid; and wherein, a storage reduction catalyst adsorbs said $NO_2$ and is used to convert said $NO_2$ in the presence of said hydrocarbons, to $N_2$, $CO_2$, and $H_2O$.

20. A method for reducing nitrogen oxides ($NO_x$) in exhausts from high-temperature combustion, the method comprising the steps of:

converting substantially all NO in an engine exhaust with a non-thermal plasma to an intermediate gas flow including $NO_2$, wherein said engine exhaust comprises greater than about 50 ppmw S;

converting, in the presence of hydrocarbons, substantially all of said intermediate gas flow including $NO_2$ to an output gas flow comprising $NO_2$ conversion products of $N_2$, $CO_2$ and $H_2O$ and substantially little NO and $NO_2$ ($NO_x$), wherein said intermediate gas flow contains essentially no nitric acid; and wherein, a storage reduction catalyst adsorbs said $NO_2$ and is used to convert said $NO_2$ in the presence of said hydrocarbons, to $N_2$, $CO_2$, and $H_2O$.

21. The method defined in claim 20, wherein said storage reduction catalyst contains a component selected from the group consisting of Pt, Rh, Pd, CuO, BaO, SrO, $K_2O$, $MnO_x$, $Al_2O_3$, $SiO_2$, $ZrO_2$, $La_2O$, zeolite, cordierite and perovskite.

* * * * *